(12) United States Patent
Jou

(10) Patent No.: US 10,830,411 B2
(45) Date of Patent: Nov. 10, 2020

(54) LED LIGHT SOURCE GUIDING DEVICE

(71) Applicant: Delta Electronics, Inc., Taoyuan (TW)

(72) Inventor: Chung-Min Jou, New Taipei (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 16/146,151

(22) Filed: Sep. 28, 2018

(65) Prior Publication Data
US 2019/0128500 A1    May 2, 2019

(30) Foreign Application Priority Data

Sep. 28, 2017  (TW) .............................. 106133288 A

(51) Int. Cl.
| | |
|---|---|
| *F21V 5/04* | (2006.01) |
| *G02B 27/09* | (2006.01) |
| *G02B 6/04* | (2006.01) |
| *F21V 7/04* | (2006.01) |
| *F21Y 115/10* | (2016.01) |

(52) U.S. Cl.
CPC ................. *F21V 5/04* (2013.01); *F21V 7/04* (2013.01); *G02B 6/04* (2013.01); *G02B 27/0955* (2013.01); *F21Y 2115/10* (2016.08)

(58) Field of Classification Search
CPC .... F21V 5/04; F21V 7/04; G02B 6/04; G02B 27/0955
See application file for complete search history.

(56) References Cited

U.S. PATENT DOCUMENTS

| | | | | |
|---|---|---|---|---|
| 7,674,018 | B2* | 3/2010 | Holder | F21K 9/00 362/311.06 |
| 7,922,369 | B2* | 4/2011 | Condon | B60Q 1/32 362/311.01 |
| 2003/0053221 | A1* | 3/2003 | Coufal | G02B 19/0014 359/708 |
| 2014/0204589 | A1* | 7/2014 | Moon | F21V 7/10 362/310 |
| 2014/0252249 | A1* | 9/2014 | Doros | F21V 17/002 250/504 R |

(Continued)

FOREIGN PATENT DOCUMENTS

CN             201568890 U       9/2010

*Primary Examiner* — Anabel Ton
(74) *Attorney, Agent, or Firm* — Muncy, Geissler, Olds & Lowe, P.C.

(57) ABSTRACT

An LED light source guiding device is composed of an upper surface, a lower surface and side surfaces. The upper surface is geometrically shaped to project a light beam of a light source onto a light-receiving surface to form a rectangular light spot, and light beams projected by boundary curves of the upper surface are boundary positions of the rectangular light spot. The lower surface and the upper surface are coaxial axisymmetric surfaces, and the side surfaces surround between the upper surface and the lower surface to superimposedly project the light source on corresponding positions of the rectangular light spot: light beams projected through boundary curves of the side surfaces are projected on boundaries of the rectangular light spot, and light beams projected through interiors of the side surfaces are projected to fall within the boundaries of the rectangular light spot to enhance an illuminance of the rectangular light spot.

11 Claims, 7 Drawing Sheets

(56) References Cited

U.S. PATENT DOCUMENTS

| | | | |
|---|---|---|---|
| 2014/0340898 A1* | 11/2014 | Mallory | F21V 5/04 |
| | | | 362/237 |
| 2015/0176774 A1* | 6/2015 | Chen | H01L 33/58 |
| | | | 362/311.02 |
| 2017/0334341 A1* | 11/2017 | Kurashige | G03H 1/2286 |
| 2019/0162389 A1* | 5/2019 | Shah | G02B 6/4206 |

* cited by examiner

LED LIGHT SOURCE GUIDING DEVICE

REFERENCE TO RELATED APPLICATIONS

The present application is based on, and claims priority from, Taiwan application number 106133288, filed Sep. 28, 2017, the disclosure of which is hereby incorporated by reference herein in its entirety.

BACKGROUND OF THE INVENTION

Field of the Invention

The present invention belongs to an LED light source guiding device, and more particularly to a device capable of projecting a light source onto a light-receiving surface to form a rectangular light spot.

Description of the Prior Art

In the past, the light distribution of light source for LED lamps was realized by a reflector or a lens, among them the reflector was only used in specific occasions, and the lens can be used in most occasions, which is a more ideal light control device. For example, in the China patent "lens of free-form surface for LED light source" with patent number: CN201568890, the optical lens comprises an inner surface of free-form surface and an outer surface of free-form surface, and the free-form surface is designed by an equi-luminous grid method: each small grid of unequal size on the free-form surface of the outer surface corresponds to one of small rectangular grids with an equal area divided on a light-receiving surface; and the free-form surface of the inner surface is also divided into a same number of small grids of unequal size corresponding to the outer surface. The surface structure adopts a differential cloud point surface reconstruction method to provide a lens of free-form surface for LED light source with a light-emitting rectangular light spot, high luminous flux utilization efficiency, as well as high illuminance and uniformity. However, the optical surface proposed in this patent is described by a nonlinear simultaneous partial differential equation. This equation generally has no analytical solution, it is necessary to use numerical methods to obtain a sufficiently accurate approximate solution in order to have value in usage. However, it is difficult to converge the numerical solution to be sufficiently accurate. So far, there is no good and efficient solution, and therefore it has not been able to efficiently and uniformly project a light beam onto a light-receiving surface.

In view of the drawbacks derived from the above-mentioned conventional method, the inventor of the present invention has made improvements and innovations earnestly after years of painstaking and devotional research, and has finally successfully developed an LED light source guiding device.

SUMMARY OF THE INVENTION

In order to achieve the above object, the present invention provides an LED light source guiding device, which uses a first-order two-dimensional nonlinear ordinary differential equation algorithm to calculate a projection angle so that a projected light beam can fall on a rectangular light spot uniformly, efficiently and precisely.

An LED light source guiding device mainly comprises an upper surface with a geometric shape for projecting a rectangular light spot on a light-receiving surface, and light beams projected by boundary curves of the upper surface are projected on edge positions of the rectangular light spot; a lower surface which is an axial symmetric surface facing the upper surface; and side surfaces surrounding between the upper surface and the lower surface, boundaries of the side surfaces and the corresponding boundaries of the upper surface are common boundaries, and a light source is superimposedly projected within the rectangular light spot.

The LED light source guiding device further comprises an LED light source, the LED light source is disposed on a circuit board, and the LED light source guiding device has a light-emitting main axis, and the light-emitting main axis passes through an energy distribution center of the LED light source, and points to a direction in which the light source has the highest light intensity or a direction of a symmetry axis of the light intensity distribution.

The upper surface is an axial symmetric surface formed by a plane generated curve rotating around the light-emitting main axis, and areas around the four boundary lines are cut off. The side surfaces are formed by surrounding between the upper surface and the lower surface with four geometric curved surfaces, wherein the geometric curved surfaces facing one another are symmetrical with one another, which are two sets of symmetric surfaces, wherein light beams projected by the side surfaces are totally or partially projected to fall between a central symmetry axis of the rectangular light spot and its corresponding edges to enhance the intensity of the rectangular light spot.

Wherein the upper surface rotates to generate a plane curve that conforms to the first-order two-dimensional nonlinear ordinary differential equation of the law of refraction:

$$\frac{\partial \rho}{\partial \gamma} = \rho \frac{n_R \sin\gamma\cos\varphi - n_R \cos\gamma\sin\varphi\cos(\theta - C)}{n_R \cos\gamma\cos\varphi + n_R \sin\gamma\sin\varphi\cos(\theta - C) - n_I}$$

Wherein (θ−C) is a constant representing a certain plane comprising the symmetry axis, the symmetry axis is the light-emitting main axis, the plane curve represented by the equation is on this plane, the plane curve is the generated curve of the upper surface, the curve is rotated around the light-emitting main axis to generate a shape of the upper surface that has not been cut by four boundaries; wherein $n_I$, $n_R$ are refractive indexes of a medium where an incident light and an emergent light are; wherein the relationship between γ and φ is governed by the law of conservation of energy to determine the unique relationship between the two, and this relationship determines the form of illuminance distribution on the light-receiving surface.

A generated plane curve of the side surface conforms to the first-order two-dimensional nonlinear ordinary differential equation of the law of refraction:

$$\frac{\partial \rho}{\partial \gamma} = \rho \frac{n_R \sin\gamma\cos\varphi - n_R \cos\gamma\sin\varphi\cos(\theta - C)}{n_R \cos\gamma\cos\varphi + n_R \sin\gamma\sin\varphi\cos(\theta - C) - n_I}$$

When (θ−C) is a constant, the equation represents a curve passing the plane of the light-emitting main axis, the generated plane curves of several different positions compose sectional curve sets of the side surfaces, and the side surfaces can be constructed by the sectional curve sets, wherein $n_I$, $n_R$ are refractive indexes of a medium where the incident light and the emergent light are, and the relationship between γ and φ is governed by the law of conservation of energy to determine the unique relationship between the two.

Wherein light beams projected through boundary curves of the side surfaces are projected on boundaries of the rectangular light spot, the light-receiving surface is a plane passing through a point on the light-emitting main axis and perpendicular to the axis, and the light-receiving surface is also a plane passing through a point on the light-emitting main axis, however, an included angle between the light-receiving surface and the light-emitting main axis may not be a right angle.

The geometric shape of the upper surface is calculated by using an algorithm conformed to the first-order two-dimensional nonlinear ordinary differential equation, the lower surface is a light-incident surface, and the upper surface and the side surfaces are light-emitting surfaces. The light beam emitted by the light source enters the lower surface and projects on the light-receiving surface after leaving the light-emitting surfaces.

BRIEF DESCRIPTION OF THE DRAWINGS

The techniques of the present invention would be more understandable from the detailed description given herein below and the accompanying figures are provided for better illustration, and thus description and figures are not limitative for the present invention, and wherein.

DETAILED DESCRIPTION OF THE INVENTION

Figure 1:
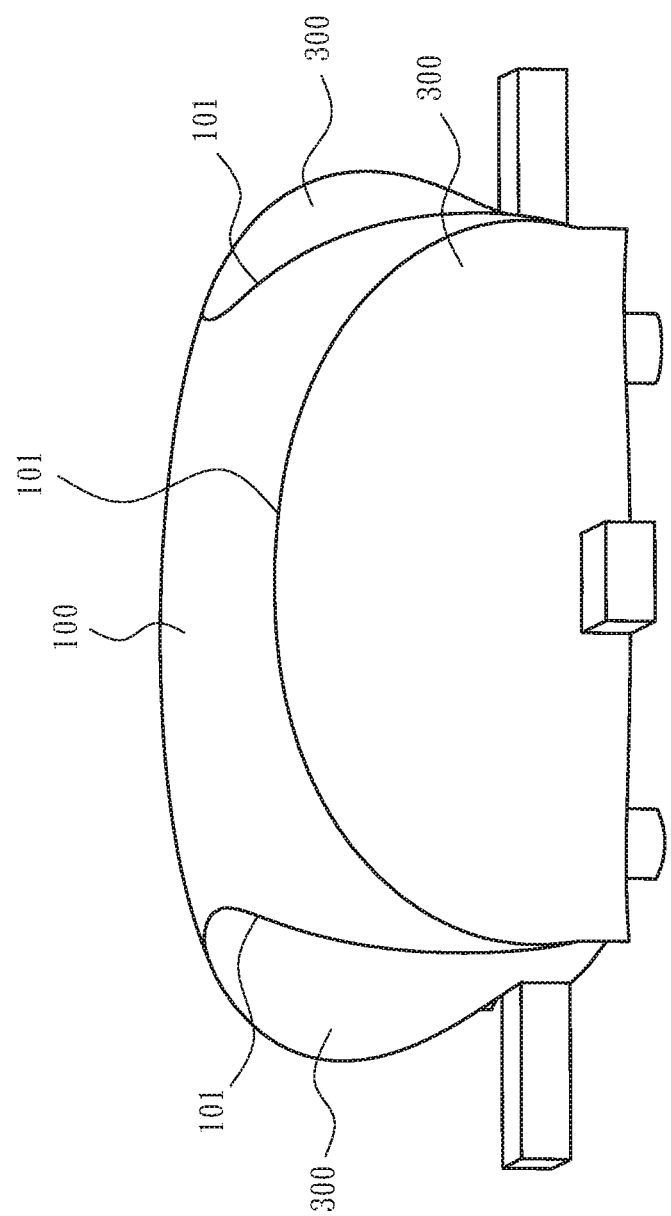
FIG. 1 is a first perspective view of an LED light source guiding device of the present invention.
Figure 2:
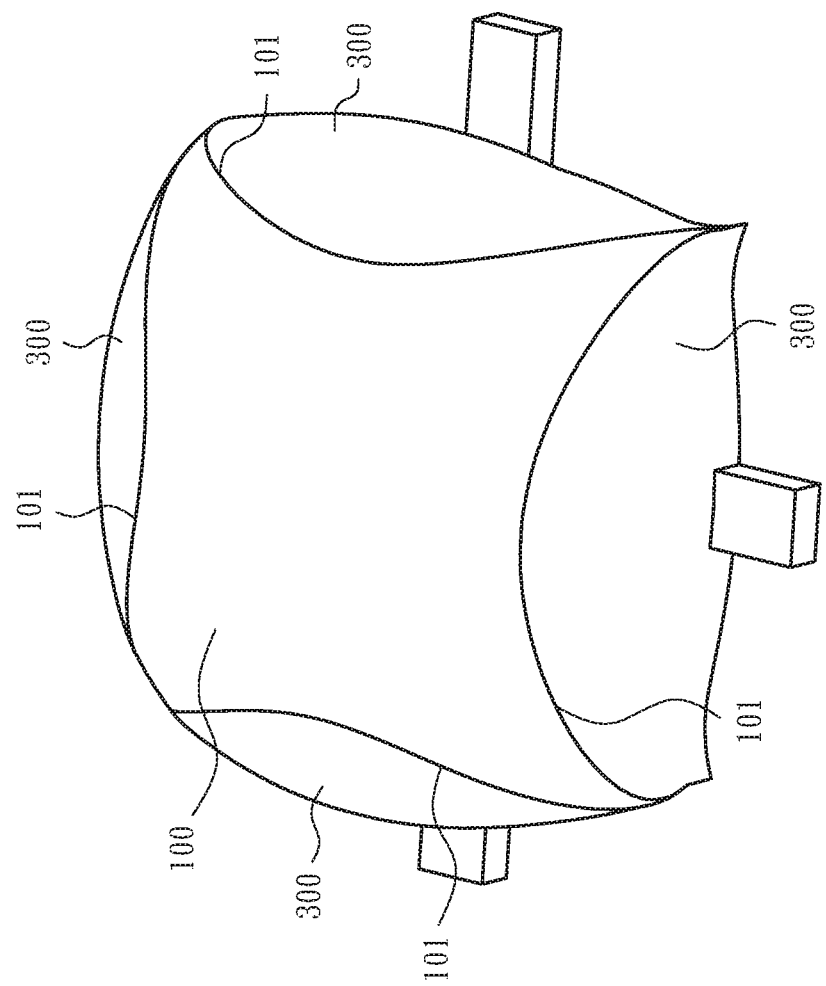
FIG. 2 is a second perspective view of the LED light source guiding device of the present invention.
Figure 3:
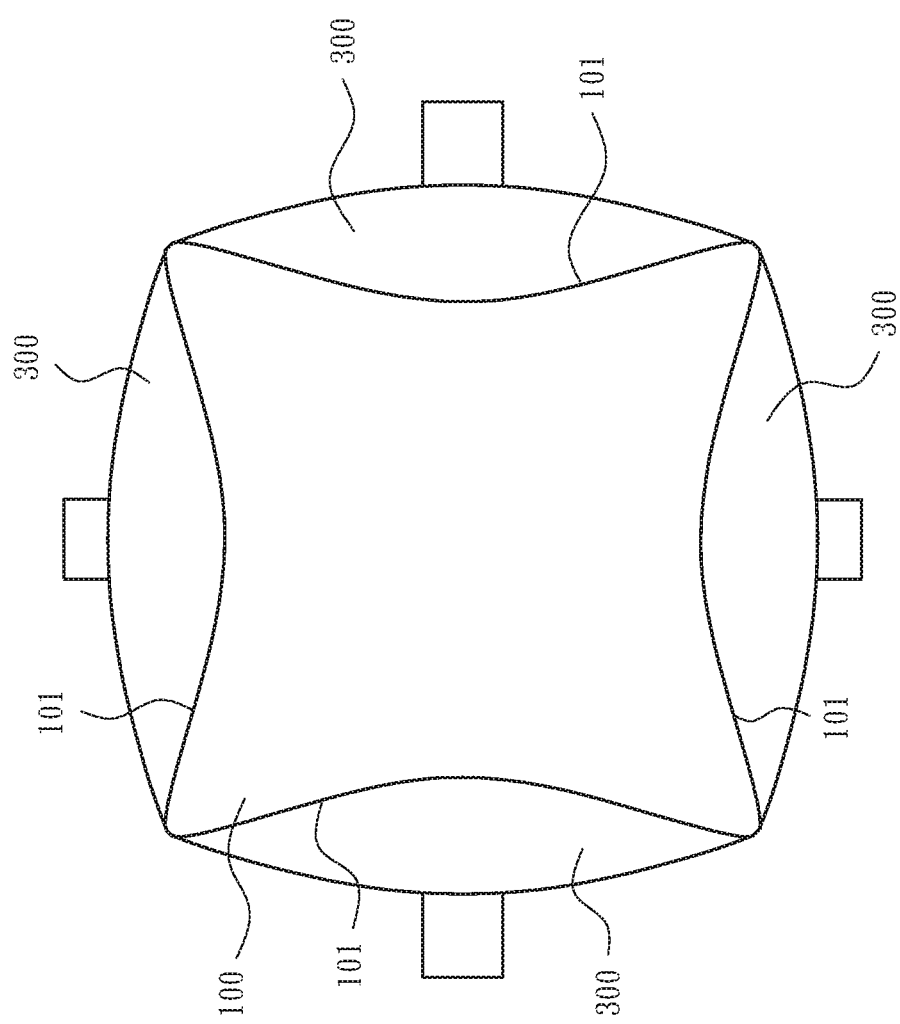
FIG. 3 is a top view of the LED light source guiding device of the present invention.
Figure 4:
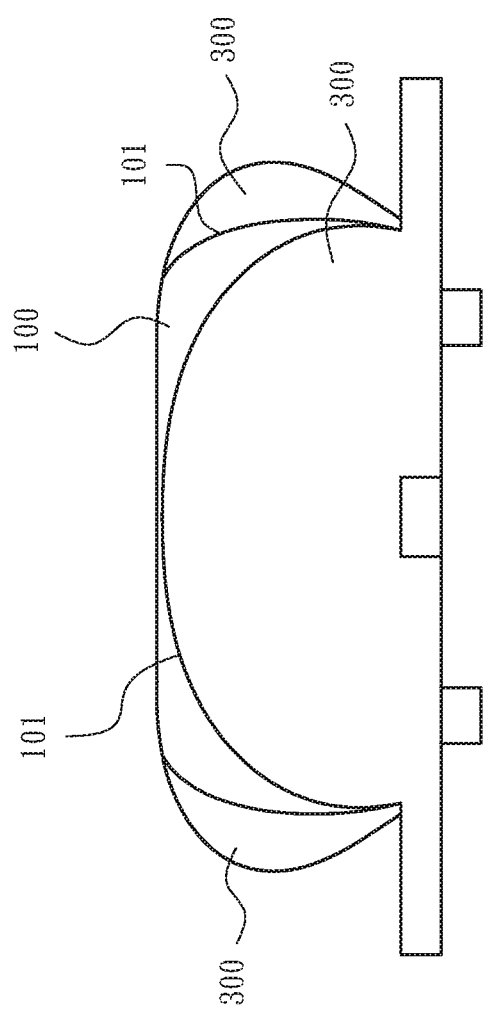
FIG. 4 is a side view of the LED light source guiding device of the present invention.
Figure 5:
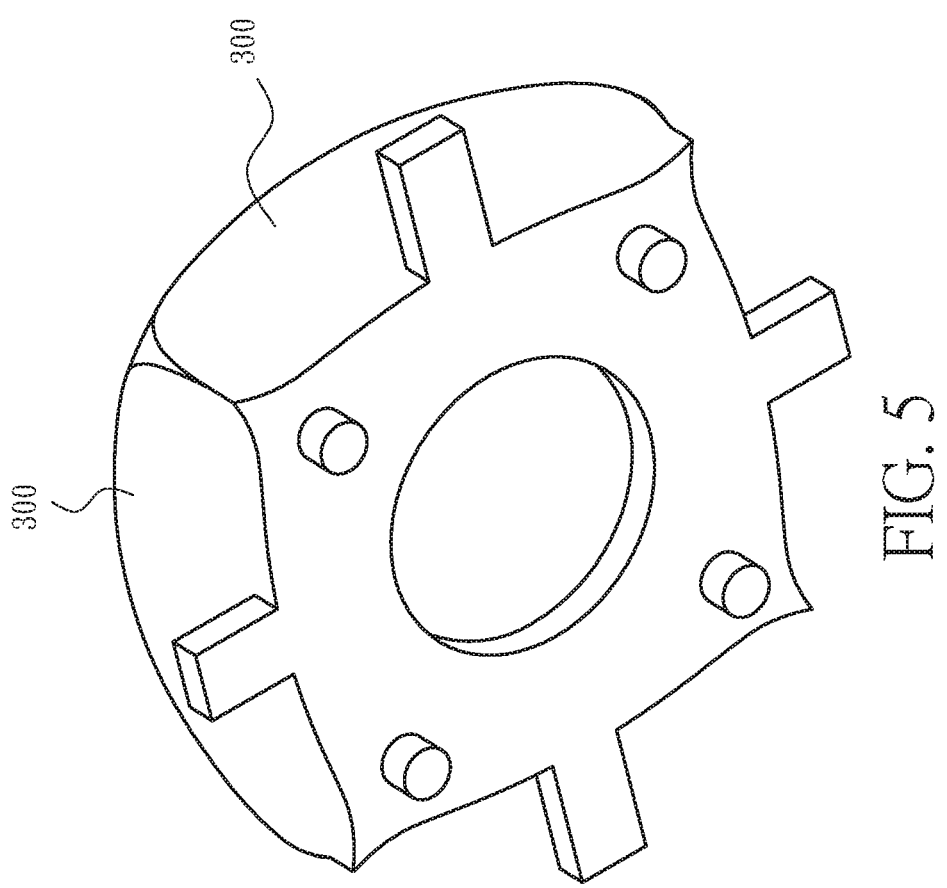
FIG. 5 is a perspective view of a bottom viewing angle of the LED light source guiding device of the present invention.
Figure 6:
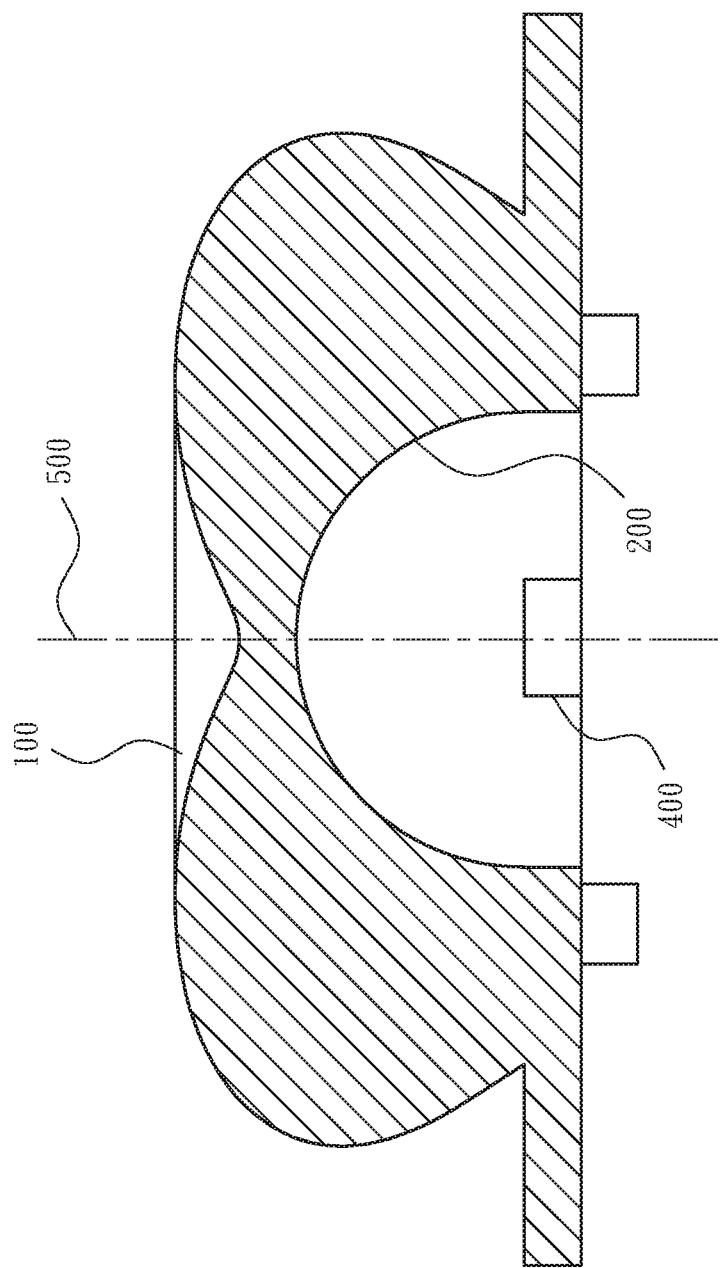
FIG. 6 is a side sectional view of the LED light source guiding device of the present invention.

The objects, technical solutions and advantages of the present invention can be best understood by referring to the following detailed description of the preferred embodiments and the accompanying drawings. It is understood that the specific embodiments described herein are merely illustrative of the present invention and are not intended to limit the present invention.

Hereinafter, the present invention will be further described with reference to the accompanying drawings:

Please refer to FIG. 1 to FIG. 6, which are respectively first perspective view, second perspective view, top view, side view, perspective view of a bottom viewing angle, and side sectional view of an LED light source guiding device of the present invention. The LED light source guiding device is provided with a straight line passing through a center of an LED light source 400 and pointing to a direction in which the light source 400 has the highest light intensity or a direction of a symmetry axis of the light intensity distribution. The straight line is set as a light-emitting main axis 500, and a plane passing through a certain point thereon and perpendicular to the light-emitting main axis 500 is set as a light-receiving surface. The LED light source guiding device mainly comprises an upper surface 100, and a geometric shape of the upper surface can cause a light beam projected by the light source 400 to fall on a rectangular light spot on the light-receiving surface, and light beams projected through boundary curves 101 of the upper surface 100 fall on edge positions of the rectangular light spot; a lower surface 200 being a concave axial symmetric surface facing toward the upper surface, and can be a revolution surface created by a quadratic curve such as a hyperbola, a parabola, an ellipse, etc., the upper surface and the lower surface have the same rotation axis, and the lower surface 200 is preferably in the shape of a hemispherical curved surface; and side surfaces 300 being two sets of mutually symmetric surfaces surrounding between the upper surface 100 and the lower surface 200, and the side surfaces 300 share common boundaries with the corresponding boundaries of the upper surface 100 to superimposedly project the light source 400 to fall within the rectangular light spot on the light-receiving surface to enhance an illuminance of the rectangular light spot.

The geometric shape of the upper surface 100 is calculated by using an algorithm conformed to a first-order two-dimensional nonlinear ordinary differential equation, the lower surface 200 is a light-incident surface, and the upper surface 100 and the side surfaces 300 are light-emitting surfaces. The light beam emitted by the light source 400 enters the lower surface 200 (light-incident surface) and projects on the light-receiving surface to form the rectangular light spot after leaving the upper surface 100 (light-emitting surface). Furthermore, when viewing from above the LED light source guiding device, the upper surface 100 is like an axial symmetric surface (such as a paraboloid, an elliptical surface, a hyperboloid) formed by a plane curve, and partial regions outside an optical path by which boundaries of the rectangular light spot are projected are cut off, thereby forming the four boundary lines of the upper surface 100.

In summary, when the light source 400 is projected into the LEI) light source guiding device, the light source 400 is guided through the lower surface 200 to project outside the LED light source guiding device via the upper surface 100 to form a rectangular light spot, while the light source 400 is refracted via the side surfaces 300, so that the light beams projected by the side surfaces 300 can be superimposedly projected to fall within the rectangular light spot to enhance the illuminance of the rectangular light spot. Furthermore, the side surfaces 300 are formed by surrounding between the upper surface 100 and the lower surface 200 with four geometric curved surfaces, wherein the geometric curved surfaces facing one another are symmetrical with one another and share common boundaries with the corresponding boundaries of the upper surface 100. In a preferred embodiment of the present invention, the light beam projected by any one of the geometric curved surfaces of the side surfaces 300 is uniformly projected and distributed between one of central symmetry axes of the rectangular light spot and a boundary position of the rectangular light spot projected by the adjacent boundary curve 101 of the upper surface 100, so that the projected light source 400 is uniformly distributed on the corresponding boundary of the rectangular light spot.

Figure 7:
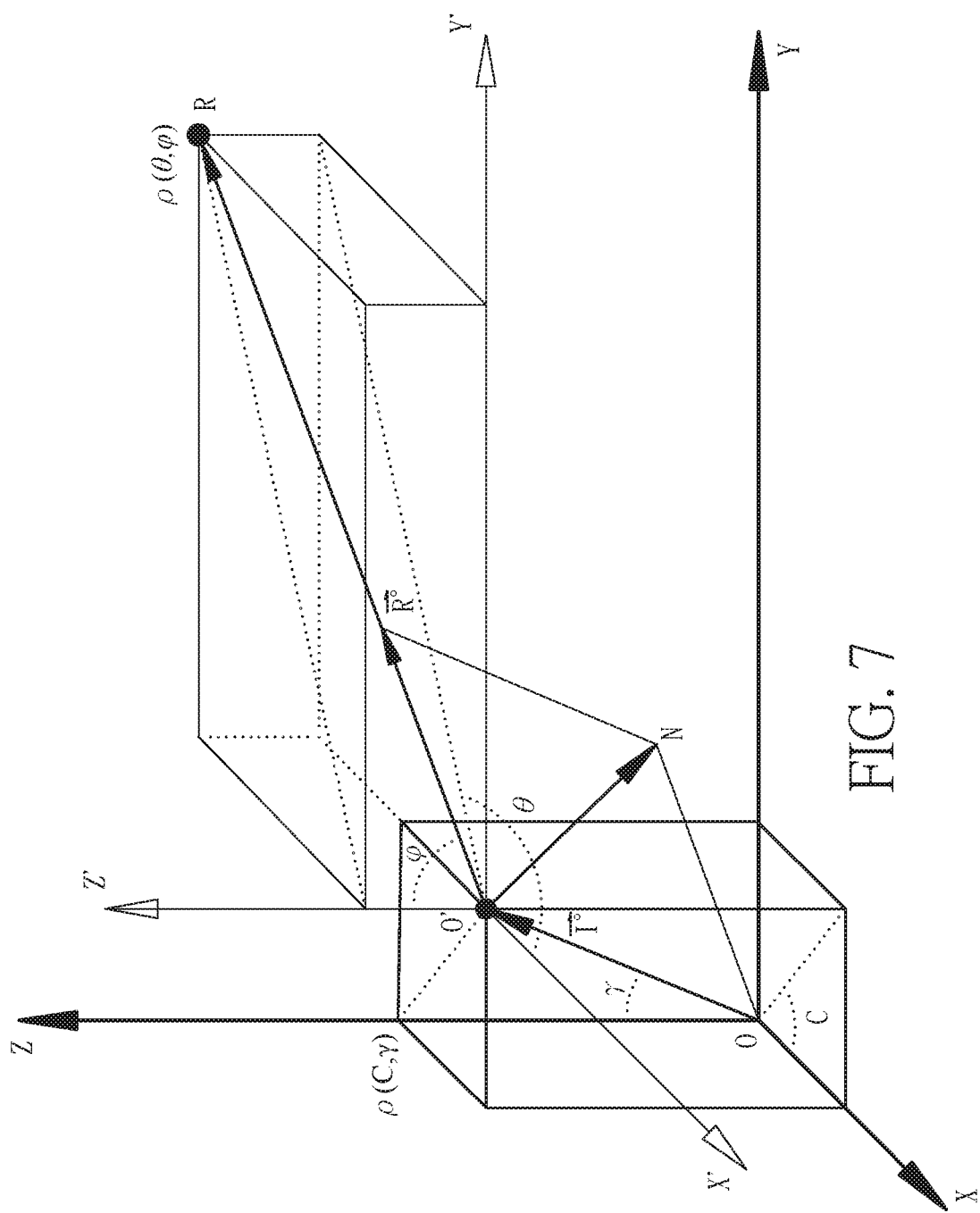
FIG. 7 is a schematic diagram of a coordinate system of an equation.

Please refer to FIG. 7, which is a schematic diagram of a light source projection and a coordinate system of an equation at any position on the upper surface of the LED light source guiding device of the present invention, wherein O is a center position of the light source 400, O' is a position of any point of the upper surface 100, and R is a target position on the light-receiving surface. The light beam starts from O to reach the optical surface O', and is refracted to reach the target point R. If the coordinate origin O in the Cartesian coordinate system is a center of the C-γ spherical coordinate system, then any point O' on the free-form surface can be expressed as ρ(C, γ), the angle C is an included angle between the projection of a vector OO' (unit vector: $\vec{I}°$) on a XOY plane and the positive direction of the X-axis, and the angle γ is an included angle between the vector OO' and the positive direction of the Z axis; if the point O' is the center of the spherical coordinate system, then the reflected light beam vector O'R can be expressed as ρ(θ, φ), wherein the angle θ is an included angle between the projection of the vector O'R (unit vector: $\vec{R}°$) on the XOY plane and the positive direction of the X-axis, the angle φ is an included angle between the vector O'R and the positive direction of the Z-axis. It is assumed that the point O' is an arbitrary point on the free-form surface, which can be expressed as O(x, y, z) in the three-dimensional Cartesian coordinate system, and expressed as ρ(C, γ) in the spherical coordinate system, in the case of axial symmetric (θ−C)=0 or a constant, then equation (1) is established:

$$\frac{\partial \rho}{\partial \gamma} = \rho \frac{n_R \sin\gamma\cos\varphi - n_R \cos\gamma\sin\varphi\cos(\theta - C)}{n_R \cos\gamma\cos\varphi + n_R \sin\gamma\sin\varphi\cos(\theta - C) - n_I} \quad \text{Equation (1)}$$

Wherein the relationship between γ and φ is governed by the law of conservation of energy to determine the unique relationship between the two, so that the two variables become dependent, so the equation can be uniquely solved. This relationship determines the form of illuminance distribution on the light-receiving surface. The energy of the light source 400 is transferred to the light-receiving surface to obtain a set light intensity distribution.

(θ−C) is a constant representing a certain plane comprising an axis of symmetry, the plane curve represented by the equation is the first-order two-dimensional nonlinear ordinary differential equation on the plane. This plane curve is the generated curve of the upper surface 100, and the upper surface 100 is generated when the curve is rotated around a direction axis of the light source 400.

As described above, the upper surface 100 of the present invention is an axial symmetrical geometric curved surface, which is represented by the differential equation 1 of the generated curve, wherein $n_I$, $n_R$ are refractive indexes of a medium where an incident light and an emergent light are, when it is refracted, $n_I \neq n_R$, when it is reflected $n_I = n_R \neq 1$, in the air is $n_I = n_R = 1$, and normal vector N of an arbitrary point on the free-form surface can be expressed by the unit vector $\vec{I}°$ of the incident light beam and the unit vector $\vec{R}°$ of the reflected light beam.

The side surfaces 300 of the present invention can define sectional curve sets of a plurality of different positions by Equation 1, and the side surfaces 300 can be respectively constructed by the sectional curve sets.

From the point of view of Equation 1, the geometric curved surface of the upper surface 100 of the present invention is a two-dimensional spatial solution method, which is simpler than the prior art three-dimensional spatial solution method of the nonlinear partial differential equation, which solves the problem that the traditional partial differential equation is difficult to solve, and can project the light beam onto the light-receiving surface efficiently and uniformly or according to the required illuminance distribution.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An LED light source guiding device, mainly comprising:
   an upper surface with a geometric shape for projecting a rectangular light spot on a light-receiving surface, and light beams projected by boundary curves of the upper surface being projected on edge positions of the rectangular light spot;
   a lower surface being an axial symmetric surface facing the upper surface; and
   side surfaces surrounding between the upper surface and the lower surface, and boundaries of the side surfaces and the corresponding boundaries of the upper surface being common boundaries to superimposedly project a light source to fall within the rectangular light spot,
   wherein the upper surface is a concave surface, and the boundary curves guide the light beams to form the rectangular light spot.

2. The LED light source guiding device as claimed in claim 1, further comprising an LED light source, the LED light source being disposed on a circuit board.

3. The LED light source guiding device as claimed in claim 1, wherein the upper surface is an axial symmetric surface formed by a plane generated curve rotating around the light-emitting main axis, and areas around the four boundary lines are cut off.

4. The LED light source guiding device as claimed in claim 1, wherein the side surfaces are formed by surrounding between the upper surface and the lower surface with four geometric curved surfaces, wherein the geometric curved surfaces facing one another are symmetrical with one another, which are two sets of symmetric surfaces.

5. The LED light source guiding device as claimed in claim 1, wherein light beams projected by the side surfaces are totally or partially projected to fall between a central symmetry axis of the rectangular light spot and its corresponding edges to enhance an intensity of the rectangular light spot.

6. The LED light source guiding device as claimed in claim 1, wherein the upper surface rotates to generate a plane curve that conforms to a first-order two-dimensional nonlinear ordinary differential equation of the law of refraction:

$$\frac{\partial \rho}{\partial \gamma} = \rho \frac{n_R \sin\gamma\cos\varphi - n_R \cos\gamma\sin\varphi\cos(\theta - C)}{n_R \cos\gamma\cos\varphi + n_R \sin\gamma\sin\varphi\cos(\theta - C) - n_I}$$

wherein (θ−C) is a constant representing a certain plane comprising the symmetry axis, the symmetry axis is the light-emitting main axis, the plane curve represented by the equation is on this plane, the plane curve is the generated curve of the upper surface, the curve is rotated around the light-emitting main axis to generate a shape of the upper surface that has not been cut by four boundaries;

wherein $n_I$, $n_R$ are refractive indexes of a medium where an incident light and an emergent light are; and wherein the relationship between γ and φ is governed by the law of conservation of energy to determine the unique relationship between the two, and this relationship determines a form of illuminance distribution on the light-receiving surface.

7. The LED light source guiding device as claimed in claim 1, wherein a generated plane curve of the side surface conforms to the first-order two-dimensional nonlinear ordinary differential equation of the law of refraction:

$$\frac{\partial \rho}{\partial \gamma} = \rho \frac{n_R \sin\gamma \cos\varphi - n_R \cos\gamma \sin\varphi \cos(\theta - C)}{n_R \cos\gamma \cos\varphi + n_R \sin\gamma \sin\varphi \cos(\theta - C) - n_I}$$

when (θ−C) is a constant, the equation represents a curve passing the plane of the light-emitting main axis, the generated plane curves of several different positions compose sectional curve sets of the side surfaces, and the side surfaces are constructed by the sectional curve sets, wherein $n_I$, $n_R$ are refractive indexes of a medium where the incident light and the emergent light are; and the relationship between γ and φ is governed by the law of conservation of energy to determine the unique relationship between the two.

8. The LED light source guiding device as claimed in claim 1, wherein light beams projected through boundary curves of the side surfaces are projected on boundaries of the rectangular light spot.

9. The LED light source guiding device as claimed in claim 1, wherein the light-receiving surface is a plane passing through a point on the light-emitting main axis and perpendicular to the axis.

10. The LED light source guiding device as claimed in claim 1, wherein the light-receiving surface is a plane passing through a point on the light-emitting main axis, and an included angle between the light-receiving surface and the light-emitting main axis may not be a right angle.

11. The LED light source guiding device as claimed in claim 2, wherein the LED light source guiding device has a light-emitting main axis, the light-emitting main axis passes through an energy distribution center of the LED light source, and points to a direction in which the light source has the highest light intensity or a direction of a symmetry axis of the light intensity distribution.

* * * * *